No. 691,202. Patented Jan. 14, 1902.
O. STUTZMAN.
BALL BEARING BOX.
(Application filed Apr. 27, 1901.)
(No Model.)

Witnesses
Edwin G. McKee
B. F. Funk

Inventor
Otto Stutzman

By Victor J. Evans.
Attorney

THE NORRIS PETERS CO., PHOTO-LITHO., WASHINGTON, D. C.

UNITED STATES PATENT OFFICE.

OTTO STUTZMAN, OF FORT ADAMS, MISSISSIPPI.

BALL-BEARING BOX.

SPECIFICATION forming part of Letters Patent No. 691,202, dated January 14, 1902.

Application filed April 27, 1901. Serial No. 57,756. (No model.)

*To all whom it may concern:*

Be it known that I, OTTO STUTZMAN, a citizen of the United States, residing at Fort Adams, in the county of Wilkinson and State of Mississippi, have invented new and useful Improvements in Ball-Bearing Boxes, of which the following is a specification.

This invention relates to new and useful improvements in ball-bearing hubs; and the object is to provide a device of the character described whereby no wear will occur upon the axle.

The invention consists in the novel construction of parts and their coacting combination, as will be hereinafter fully specified and as particularly pointed out and distinctly claimed.

I have fully and clearly illustrated the improvements in the accompanying drawings, wherein—

Figure 1:
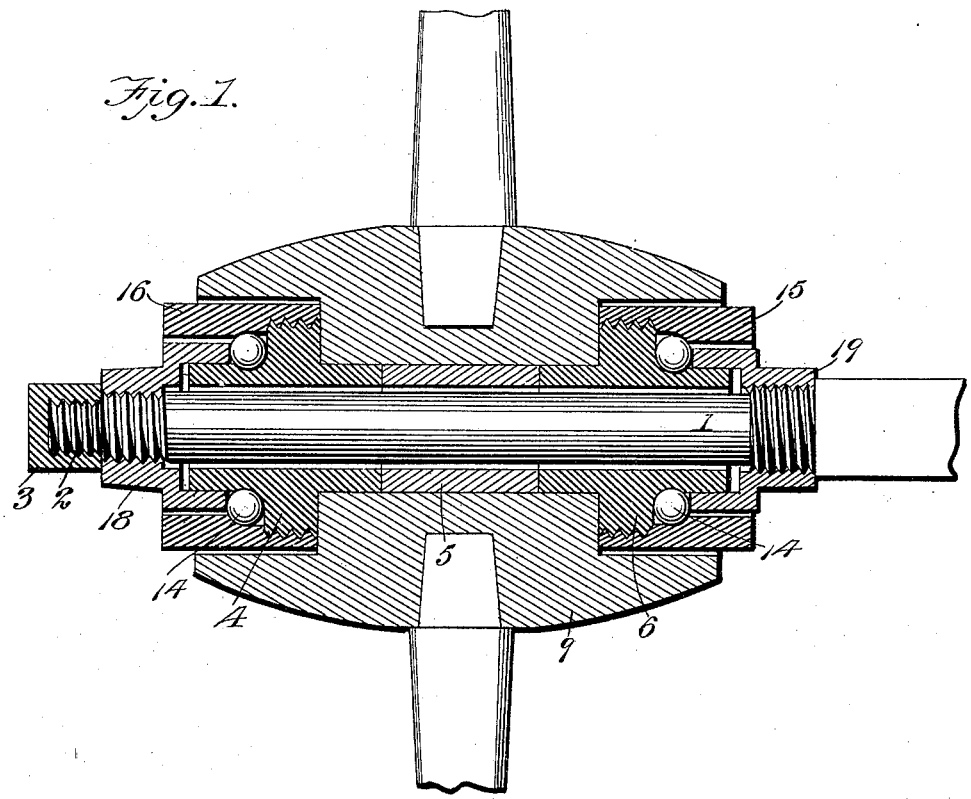
Figure 2:
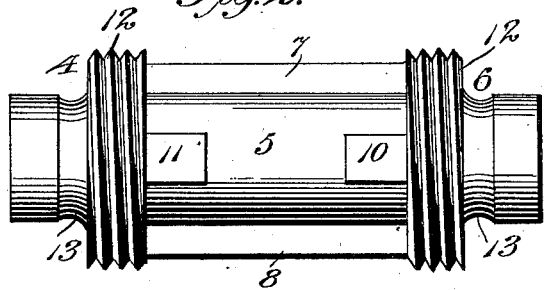

Figure 1 is a vertical longitudinal sectional view showing the parts as in operative assemblage. Fig. 2 is a side elevation of the core of the hub.

Referring to the drawings, 1 designates the spindle or arm of the axle, provided at its outer and inner ends with screw-threads, as shown, and a reduced outer end 2, also provided with screw-threads, with which a threaded cap or nut 3 engages to fasten the hub on the spindle and also to secure it in adjusted position thereon.

4 and 6 designate sleeves arranged on the spindle or arm of the axle, each having a bore of larger diameter than the spindle, so that when they are revolved they will be free from contact therewith. Each of these sleeves is formed with an annular collar 12, having screw-threads, as shown, and at the base of the annular collars on the outer side is formed an annular ball-race 13, wherein are seated antifriction-balls 14. On the inner ends or faces of the sleeves 4 and 6 are formed inwardly-extending lugs 10 11, which interengage with corresponding slots or recesses formed in an intermediately-disposed axle-sleeve 5. This sleeve 5 is a cylindrical tube extending between the sleeves 4 and 6 on the axle and having its bore in alinement therewith and is formed with slots or recesses which fit over the tongues or lugs 10 11 and hold the end sleeves and itself united in revolution. To hold the three sleeves rigid in relation to the hub 9, the sleeve 5 is formed with radial flanges 7 8, extending longitudinally and engaging in suitable seats in the hub.

18 19 designate inner and outer caps formed with neck-pieces having interior screw-threads to engage the threaded portions at the ends of the spindle and enlarged at their inner portions, forming extended circular overhanging flanges adapted to fit over the outer end portion of the sleeves 4 and 6 and to abut with their inner ends against the bearing-balls 14, as shown in Fig. 1 of the drawings.

15 16 indicate rings arranged at the respective ends of the hub, having their inner ends internally threaded to engage the screw-threads on the annular collars on the sleeves 4 and 6 and having their inner faces adjacent to the threaded portions made with an inner annular seat to set over and engage the ball-bearings. The outer extending portions of these rings 15 16 overhang the fastening-caps, as indicated. The respective ends of the hub are formed with circular chambers which take in and overhang the end elements of the hub.

The parts may be assembled by screwing the inner cap 19 onto the inner threaded portion of the axle, then arranging the ring 15 in position, and then slipping the sleeve 6 on the spindle with the ball-bearing in position, and then screwing up the ring 15 until the parts assume the relative position shown in the drawings. The middle sleeve 5 is then slipped on the axle, with the recesses therein engaging the tongues on the sleeve, as indicated in Fig. 2. The hub 9 is then placed on and over the parts assembled, as stated. Then sleeve 4 is slipped over the spindle, the balls arranged thereon, and the cap 18 screwed up. Then the ring 16 is screwed up, and then the cap or nut 3 screwed up on the end of the spindle.

It will be perceived from the foregoing description, taken in connection with the drawings, that the weight of the load is carried on the antifriction ball-bearings and that the respective sleeves of the hub are free from bearing on the spindle. This is the function of the relative disposition of the respective parts, the bearings being so arranged that the rings 15 16 carry the hub on the bearings, and the sleeves in the hub having a bore of greater diameter than the spindle they rotate free from that element.

What I claim, and desire to secure by Letters Patent, is—

In combination with the spindle of the axle having threaded portions at its respective ends, of oppositely-arranged caps fitted to the said threaded portions, and having inwardly-projecting circular flanges, sleeves, having bores of larger diameter than the spindle, having annular collars screw-threaded on their perimeter and annular ball-bearing races, and extending under the overhanging flanges of the said caps, end rings having interior threads to engage the collars of said sleeves, ball-bearings between the sleeves, the caps and the rings, an intermediate sleeve interlocking with the other sleeves, a hub portion arranged thereon, to rotate with the sleeves, and a fastening-nut, substantially as described.

In testimony whereof I affix my signature in presence of two witnesses.

OTTO STUTZMAN.

Witnesses:
  JACOB G. STUTZMAN,
  LUCIEN D. OTEY.